United States Patent [19]

Altman et al.

[11] Patent Number: 4,793,965

[45] Date of Patent: Dec. 27, 1988

[54] SIMPLIFIED, FLEXIBLE TOP END SUPPORT FOR CANTILEVER-MOUNTED ROD GUIDES OF A PRESSURIZED WATER REACTOR

[75] Inventors: Denis J. Altman, Penn Township, Westmoreland County; Douglas E. Ekeroth, Plum Borough, Allegheny County, both of Pa.

[73] Assignee: Westinghouse Electric Corp., Pittsburgh, Pa.

[21] Appl. No.: 926,295

[22] Filed: Nov. 3, 1986

[51] Int. Cl.4 .............................................. G21C 1/01
[52] U.S. Cl. ..................................... 376/353; 376/463
[58] Field of Search ............... 376/285, 353, 362, 364, 376/446, 448, 449, 463, 332

[56] References Cited

U.S. PATENT DOCUMENTS

| | | | |
|---|---|---|---|
| 3,212,981 | 10/1965 | Tollet et al. | 376/332 |
| 3,227,624 | 1/1966 | Lechevallier | 376/332 |
| 4,684,502 | 8/1987 | Wilson et al. | 376/446 |
| 4,687,628 | 8/1987 | Gillett et al. | 376/353 |
| 4,707,331 | 11/1987 | Sherwood et al. | 376/353 |

Primary Examiner—Deborah L. Kyle
Assistant Examiner—Richard Klein
Attorney, Agent, or Firm—D. C. Abeles

[57] ABSTRACT

A support for the top ends of plural rod guides of at least first and second types which are generally vertically disposed within a pressurized water reactor vessel in corresponding, first and second interleaved matrices. Lower ends of the rod guides are affixed to a lower support structure and the upper ends thereof are disposed adjacent to and spaced vertically below an upper support structure of the vessel. Corresponding, first and second types of top support plates are disposed on and connected to respective top ends of the first and second types of rod guides. The first and second types of top support plates have mating exterior peripheral surfaces which are assembled in sliding, telescoping relationship, a transverse extension from one peripheral surface being received in a vertically extending, recessed channel in a mating peripheral surface of the contiguous support plates. A linkage is secured to a top support plate of one type and to each of the mating top support plates of the other type contiguously surrounding it, providing rigid lateral interconnection and resilient vertical interconnection of the top plates and maintaining same in a concatenated relationship.

25 Claims, 7 Drawing Sheets

SIMPLIFIED, FLEXIBLE TOP END SUPPORT FOR CANTILEVER-MOUNTED ROD GUIDES OF A PRESSURIZED WATER REACTOR

BACKGROUND OF THE INVENTION

1. Field of the Invention

This invention relates to the pressure vessel of a pressurized water reactor system of an advanced design in which plural rod guides are cantilever-mounted at their lower ends and extend in parallel, vertical relationship to dispose the upper ends thereof adjacent a calandria assembly and, more particularly, to a simplified, flexible top end support for the cantilever-mounted rod guides of such a pressurized water reactor.

2. State of the Relevant Art

Conventional pressurized water reactors employ a number of control rods which are mounted within the reactor vessel, generally in parallel axial relationship, for axial translational movement in telescoping relationship with the fuel rod assemblies. The control rods contain materials which absorb neutrons and thereby lower the neutron flux level within the core. Adjusting the positions of the control rods relatively to the respectively associated fuel rod assemblies thereby controls and regulates the reactivity and correspondingly the power output level of the reactor. Typically, the control rods, or rodlets, are arranged in clusters, and the rods of each cluster are mounted at their upper ends to a common, respectively associated spider. Each spider, in turn, is connected to a respectively associated adjustment mechanism for raising or lowering the associated rod cluster.

In certain advanced designs of such pressurized water reactors, there are employed both control rod clusters (RCC) and water displacer rod clusters (WDRC), and also so-called gray rod clusters which, to the extent here relevant, are structurally identical to the RCC's and therefore both are referred to collectively hereinafter as RCC's. In an exemplary such reactor design, a total of over 2800 reactor control rods and water displacer rods are arranged in 185 clusters, each of the rod clusters having a respectively corresponding spider to which the rods of the cluster are individually mounted. Further, there are provided, at successively higher, axially aligned elevations within the reactor vessel, a lower barrel assembly, an inner barrel assembly and a calandria assembly, each of generally cylindrical configuration; a removable, upper closure dome seals the top of the vessel and is removable to gain access to the vessel interior.

The lower barrel assembly has mounted therein, in parallel axial relationship, a plurality of fuel rod assemblies, comprising the reactor core. The fuel rod assemblies are supported at the lower and upper ends thereof, respectively, by corresponding lower and upper core plates. The inner barrel assembly comprises a cylindrical sidewall which is welded at its bottom edge to the upper core plate. Within the inner barrel assembly there are mounted a large number of rod guides disposed in closely spaced relationship, in an array extending substantially throughout the cross-sectional area of the inner barrel assembly. The rod guides are of first and second types, respectively housing therewithin the reactor-control rod clusters (RCC) and the water displacer rod clusters (WDRC); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower overall fuel costs. Consistent with this objective, the water displacement rodlet clusters (WDRC's) function as a mechanical moderator and provide spectral shift control of the reactor. Typically, a fuel cycle is of approximately 18 months, following which the fuel must be replaced. When initiating a new fuel cycle, all of the WDRC's are fully inserted into association with the fuel rod assemblies, and thus into the reactor core. As the excess reactivity level of the fuel diminishes over the cycle, the WDRC's are progressively, in groups, withdrawn from the core so as to enable the reactor to maintain the same reactivity level, even though the reactivity level of the fuel rod assemblies is reducing due to dissipation over time. Conversely, the control rod clusters are moved, again in axial translation and thus telescoping relationship relatively to the respectively associated fuel rod assemblies, for control of the reactivity and correspondingly the power output level of the reactor on a continuing basis, for example in response to load demands, in a manner analogous to conventional reattor control operations.

A reactor incorporating WDRC's is disclosed in U.S. patent application Ser. No. 217,503, filed Dec. 16, 1980 and entitled MECHANICAL-SPECTRAL SHIFT REACTOR and in further applications cited therein. A system and method for achieving the adjustment of both the RCC s and WDRC's are disclosed in the co-pending application of Altman et al., entitled "DISPLACER ROD DRIVE MECHANISM VENT SYSTEM." Each of the foregoing applications is assigned to the common assignee hereof and is incorporated herein by reference.

A critical design criterion of such advanced design reactors is to minimize vibration of the reactor internals structures, as may be induced by the core outlet flow as it passes therethrough. A significant factor for achieving that criterion is to maintain the core outlet flow in an axial direction throughout the inner barrel assembly of the pressure vessel and thus in parallel axial relationship relative to the rod clusters and associated rod guides. The significance of maintaining the axial flow condition is to minimize the exposure of the rod clusters to cross-flow, a particularly important objective due both to the large number of rods and also to the type of material required for the WDRC's, which creates a significant wear potential. This is accomplished by increasing the vertical length, or height, of the vessel sufficiently such that the rods, even in the fully withdrawn (i.e., raised) positions within their inner barrel assembly, remain located below the vessel outlet nozzles, whereby the rods are subjected only to axial flow, and through the provision of a calandria assembly, which is disposed above the inner barrel assembly and thus above the level of the rods and which is disposed to withstand the cross-flow conditions.

In general, the calandria assembly comprises a lower calandria plate and an upper calandria plate which are joined by a cylindrical side wall, and an annularly flanged cylinder which is joined at its loeer cylindrical end to the upper calandria plate and is mounted by its upper, annularly flanged end on an annular supporting ledge of the pressure vessel. The rod guides are cantilever-mounted at their lower ends to the upper core plate and at their upper ends to the lower calandria plate. Within the calandria assembly and extending between aligned apertures in the lower and upper calandria plates is mounted a plurality of calandria tubes, positioned in parallel axial relationship and respectively aligned with the rod guides. A number of flow holes are provided in the lower calandria plates, at positions displaced from the apertures associated with the calandria tubes through which the reactor core outlet flow passes as it exits from its upward passage through the inner barrel assembly. The calandria assembly receives the axial core outlet flow, and turns the flow from the axial direction through 90° to a radially outward direction for passage through the radially oriented outlet nozzles of the vessel. The calandria thus withstands the crossflow generated as the coolant turns from the axial to the radial directions, and provides for shielding the flow distribution in the upper internals ff the vessel.

Advanced design pressurized water reactors of the type here considered incorporating such a calandria assembly are disclosed in the co-pending U.S. patent applications: Ser. No. 490,101 to James E. Kimbrell et al., for "NUCLEAR REACTOR"; U.S. patent application Ser. No. 490,059 to Luciano Veronesi for "CALANDRIA"; and U.S. patent application Ser. No. 490,099, "NUCLEAR REACTOR", all thereof concurrently filed on Apr. 29, 1983 and incorporated herein by reference.

Maintenance of suhh reactors, for example, requires that the upper closure dome be removed to provide access to the calandria assembly which in turn is removed to afford access to the WDRC and RCC rod clusters for repair or replacement, and as well to the core for rearrangement or replacement of the fuel rod assemblies. To accomplish this, the calandria assembly typically is removable from the inner barrel assembly, withdrawing thereby the WDRC and RCC rods from within the corresponding rod guides.

As before noted, the rod guides for each of the RCC and WDRC rod clusters are mounted rigidly at their bottom ends to the upper core plate, preferably by being bolted thereto, and extend in parallel axial relationshi to dispose the upper, free ends thereof adjacent the lower calandria plate. This cantilever-type mounting is necessitated to accommodate axial (i.e., vertical) movement of the free ends of the rod guides, which occurs due to thermal expansion and thus axial elongation of the rod guides, and fixed end motion caused by vibration and/or flexing of the upper core plate to which the bottom, fixed end of the rod guides are mounted.

Because of these factors, it is not possible to rigidly and permanently secure the free ends of the rod guides to the lower calandria plate. Preferably, the design of the pressure vessel and particularly of the support structures which mount the free ends of the rod guides to the lower calandria plate permit both the assembly and removal of the calandria, relatively thereto, without special tools. Nevertheless, the mounting means for the free ends of the rod guides not only must constrain the same against lateral motion due to vibration, flow and thermal forces while accommodating the aforesaid axial movement of the free ends of the rod guides, but also must avoid wear of the reactor internals arising out of loads imposed on the guides and the previously discussed axial motion of the free ends of the guides.

In some existing designs and as used with conventional reactors, split pins are employed at the free ends of the rod guides for restricting lateral motion while permitting a limited extent of axial motion. Such designs, however, present wear concerns for the reasons above-noted. In fact, due to the high loads and large axial motion of the free ends in the advanced design pressure vessels, the use of split pins for the free end supports is deemed not practical.

There thus exists a substantial need for a top end support structure for the top, free ends of the rod guides in such advanced design reactors, which satisfies these complex structural and operational requirements but yet which is of simple design and employs a minimum number of parts, thereby to achieve cost economies both in the construction and also in the maintenance of such reactors.

CROSS-REFERENCE TO RELATED APPLICATIONS

The present invention is related to the top end support assembly disclosed in the co-pending application of Gillett et al. entitled "FLEXIBLE ROD GUIDE SUPPORT STRUCTURE FOR INNER BARREL ASSEMBLY OF PRESSURIZED WATER REACTOR", now U.S. Pat. No. 4,687,628 assigned to the common assignee hereof and incorporated herein by reference. As disclosed therein, respective, differently configured top support plates are mounted on the free ends of the RCC and the WDRC rod guides, respectively, and have mating, respective exterior and interior vertices to permit assemblage of same in an interdigitized array. Flexible linkages connect the top plates in a concatenated relationship, and serve to restrain relative, lateral movement while permitting relative axial movement therebetween. Stop pins are received in aligned bores of the contiguous interdigitated top plates and serve to limit the extent of load which can be applied to the linkages and thus the ultimate extent of relative movement between the concatenated top plates. The RCC top plates include openings, preferably of cylindrical configuration, which receive corresponding cylindrical extensions which are secured to and extend downwardly from the lower calandria plate, thereby establishing basic alignment of the concatenated and interleaved matrices of the plates. Leaf springs secured to the calandria bottom plate engage and exert a downward force on the top surfaces of the RCC top plates, thereby establishing a frictional force which further opposes lateral movement of the RCC top plates and correspondingly, through the concatenated and interleaved arrangement, any lateral movement of the WDRC top plates, as well, while permitting restrained axial displacement, or movement, of the individual RCC and WDRC rod guides.

While the flexible support structure of the referenced Gillett et al. application satisfies many of the requrrements before noted, the structure is of complex design and requires the use of numerous elements, contributing to increased costs of construction and maintenance of the reactor. Because of the interdigitized and concatenated relationship of the WDRC and RCC top plates, removal of any individual WDRC rod guide requires removal of the four RCC rod guides, the top plates of which are received in mating and overlapping relationship about the corner vertices of the top plate of the WDRC rod guide which is to be removed; this, moreover, requires that not only the flexible linkage for the given WDRC top plate be removed, but also the flexible linkage associated with each of the surrounding, mating RCC top plates be removed. For the disclosed, preferred embodiment of the Gillett et al. application, this requires removal of nine flexible linkages, each of which is held in place by eight associated bolts, and thus removal of a total of 72 bolts. Further, each of the invoeled WDRC and RCC rod guides must be released from its rigid mounting to the upper core plate, typically afforded likewise by bolts. The interleaved and interdigitated relationship of the WDRC and RCC top plates further requires that all the WDRC rod guides be installed prior to installation of the RCC rod guides. This imposes a necessary sequence of installation, which must be followed to achieve the desired assembly.

Thus, there exists a need for a top end support for the cantilever-mounted WDRC and RCC rod guides of a pressurized water reactor, which affords the beneficial features of the Gillett et al. structure, but which employs a reduced number of parts including WDRC and RCC top plates of simplified configurations, and thus is of reduced cost, and which is free of the constraints of a prescribed sequence of assembly and disassembly and instead permits simplification thereof, thereby to reduce the time required for, and the costs of maintenance operations.

SUMMARY OF THE INVENTION

The present invention both satisfies the before-noted requirements of the top end supports for the rod guides and also achieves the aforestated objectives. Particularly, the simplified, flexible support structures for the top ends of the rod guides, in accordance with the present invention, comprise, as major components, interdigitized matrices of respective RCC and WDRC top plates for the corresponding RCC and WDRC rod guides, which are self-aligning during assembly without prescribing a given sequence of that assembly. Mating alignment surfaces are formed on the major arms of the RCC and WDRC top plates so as to permit a sliding, or telescoping, assemblage of same. The mating exterior and interior vertices of contiguous, respective WDRC and RCC top plates are machined to define corresponding keyway segments which are aligned when the contiguous WDRC and RCC top plates are mounted in position, and accommodate therein a key of generally rectangular configuration. One end of the key has a bore formed therein which is in alignment with a threaded bore in the RCC top plate. A flexible linkage of integral arms in a generally square configuration is received on each WDRC top plate. The respective linkage arms have central apertures in alignment with threaded bores centrally disposed in the corresponding major arms of the WDRC top plate and the linkage vertices have apertures in alignment with the bores in tee corresponding keys and the respective, aligned threaded bores in the contiguous RCC top plates. Bolts received through the central apertures of the linkage arms secure the linkage to the associated WDRC top plate and further bolts received through the apertures in the linkage vertices secure both the underlying key and the linkage to the contiguous, respective RCC top plates. In the assembled relationship, the flexible linkages laterally interlock the matrices of top plates in a two-dimensional, concatenated relationship in a plane perpendicular to the axes of the rod guides. Each WDRC top plate is linked rigidly in the lateral direction to the four respectively surrounding, contiguous, RCC top plates—and, in turn, each of the RCC top plates is laterally interlocked at its four interior vertices to the associated exterior vertices of four WDRC top plates which are interdigitized and contiguous therewith. The guides are thus essentially bound together laterally; however, the linkages are flexible in the out-of-plane direction and thus accommodate relative axial motion between adjacent guides. This compensates for local differences in the height of adjacent guides, arising out of manufacturing tolerances and/or due to differential axial expansion from thermal effects and/or bowing of the ood guides due to pressure differentials across the guides. Collectively, the leaf springs 140 function to resist movement of the rod guides in unison, or as a package, and the linkages serve to resist individual rod guide motion, relative to the stability afforded by the collective action of the leaf springs 140—correspondingly preventing wear of the rod guides and of each rod cluster, relative to its associated, individual rod guide.

Generally cylindrical calandria extensions affixed to the lower calandria plate and projecting downwardly therefrom are received within corresponding apertures centrally disposed in the RCC top guides, and provide basic alignment of the matrix of the RCC top plates and, correspondingly, of the concatenated and interdigitized matrix of WDRC plates. Rod guide leaf springs are mounted on the lower calandria plate and extend downwardly therefrom, imposing an axial resilient load against the RCC top plates. The leaf springs generate sufficient lateral frictional force to offset fluctuating steady state loads imposed on the rod guides. Moreover, the calandria extensions provide overall lateral support during excessive load conditions, such as seismic and LOCA, wherein such loading exceeds the lateralffrictional force of the leaf springs.

These and other advantages of the simplified, flexible rod guide support for the rod guides within the inner barrel assembly of a pressurized water reactor in accordance with the present invention will become more apparent from the following detailed description and drawings, wherein like reference numerals refer to like parts, throughout.

DETAILED DESCRIPTION OF THE PREFERRED EMBODIMENTS

Figure 1A:
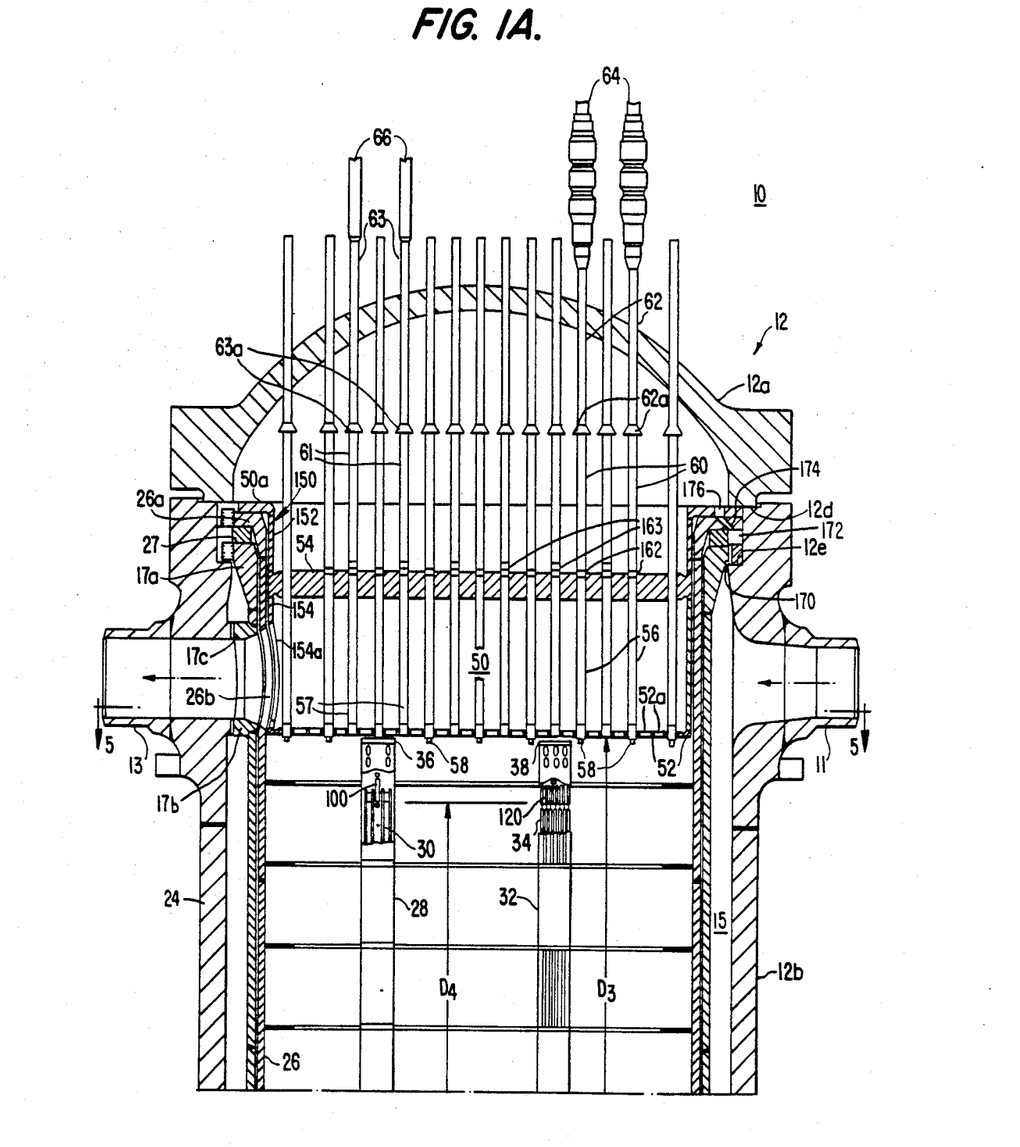
FIGS. 1A and 1B, in the composite, comprise an elevational view, partially in cross-section, of an advanced design, pressurized water reactor of the type with which the simplified flexible top end support for cantilever-mounted rod guides in accordance with the present invention are intended to be employed.
Figure 1B:
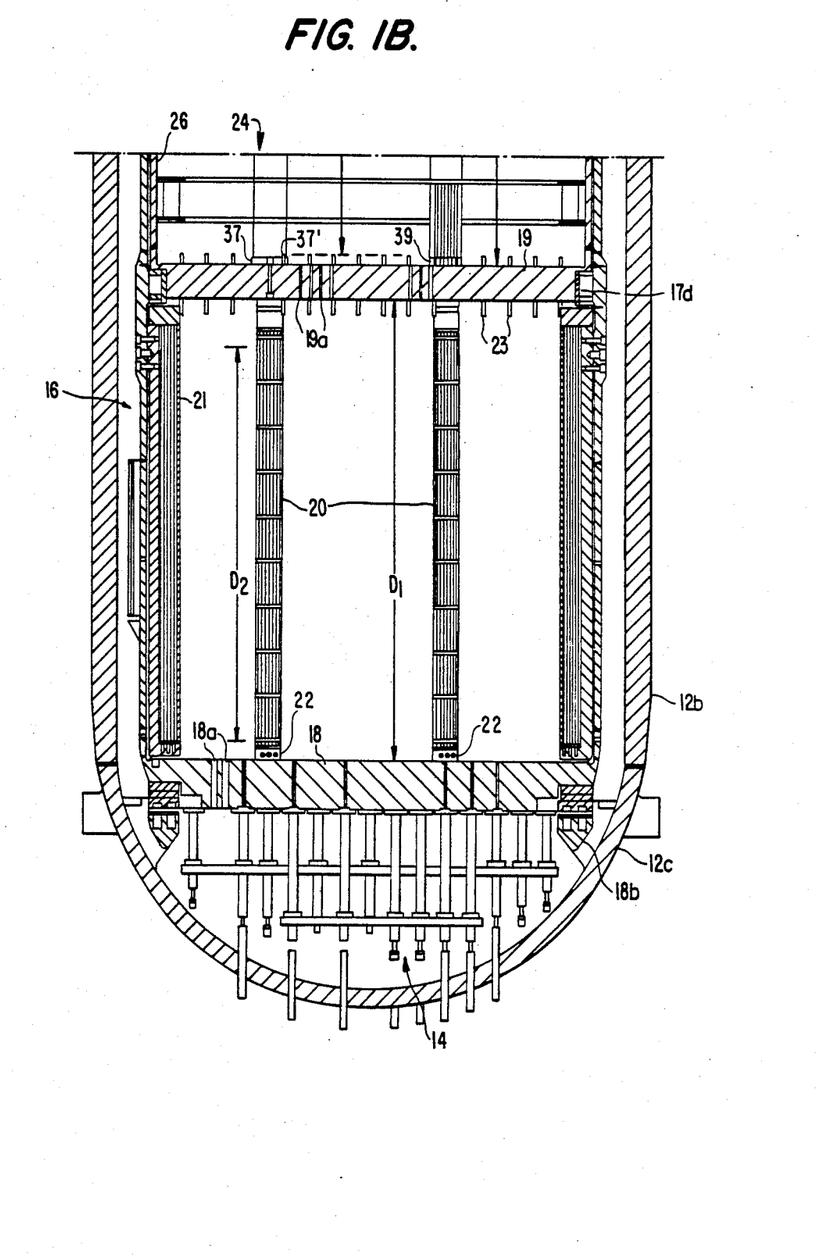

The composite of FIGS. 1A And 1B (referred to hereinafter as FIG. 1) is an elevational view, partly in cross-section, of a pressurized water reactor 10 comprising a pressure vessel 12 including an upper dome, or head assembly, 12a, cylindrical sidewalls 12b, and a bottom closure 12c comprising the base of the reactor 10. Plural radially oriented inlet nozzles 11 and outlet nozzles 13 (only one (1) of each appearing in FIG. 1) are formed in the sidewall 12b, adjacent the upper, annular end surface 12d of the sidewall 12b. Whereas the cylindrical sidewall 12b may be integrally joined, as by welding, to the bottom closure 12c the head assembly 12a is removably received on the upper, annular end surface 12d of the sidewall 12b and secured thereto. The sidewall 12b further defines an inner, generally annular mounting ledge 12e for supporting various internal structures as later described. Within the bottom closure 12c, as schematically indicated, is so-called bottom-mounted instrumentation 14.

The lower barrel assembly 16 comprises a generally cylindrical sidewall 17 affixed at its lower end to a lower core plate 18, which is received on mounting support 18b, as generally schematically illustrated. The cylindrical sidewall 17 extends substantially throughout the axial height of the vessel 12 and includes an annular mounting ring 17a at the upper end thereof which is received on the annular mounting ledge 12e thereby to support the assembly 16 within the vessel 12. As will be rendered more apparent hereafter, the sidewall 17 is solid in the vicinity of the inlet nozzles 11, but includes an aperture 17b having a nozzle ring 17c mounted therein which is aligned with and closely adjacent to the outlet nozzle 13, for each such nozzle. An upper core plate 19 is supported on a mounting support 17d affixed to the interior surface of the cylindrical sidewall 17 at a position approximately one-half the axial height thereof. Fuel rod assemblies 20 are positioned in generally vertically oriented, parallel axial relationship within the lower barrel assembly 16 by bottom mounts 22 carried by the lower core plate 18 and by pinlike mounts 23 carried by, and extending through, the upper core plate 19. Flow holes 18a and 19a (only two of which are shown in each instance) are provided in predetermined patterns, extending substantially throughout the areas of the lower and upper core plates 18 and 19, respectively. The flow holes 18a permit passage of a reactor coolant fluid into the lower barrel assembly 16 in heat exchange relationship with the fuel rod assemblies 20, which comprise the reactor core, and the flow holes 19a permit passage of the core output flow into the inner barrel assembly 24. A neutron reflector and shield 21 is mounted interiorly of the cylindrical sidewalls 17, in conventional fashion.

The inner barrel assembly 24 includes a cylindrical sidewall 26 which is integrally joined at its lower edge to the upper core plate 19. The sidewall 26 has secured to its upper, open end, an annular mounting ring 26a which is received on an annular hold-down spring 27 and supported along with the mounting ring 17a on the mounting ledge 12e. The sidewall 26 further includes an aperture 26b aligned with the aperture 17b and the output nozzle 13. Within the inner barrel assembly 24, and densely packed within the cylindrical sidewall 26, are positioned a plurality of rod guides in closely spaced, parallel axial relationship; for simplicity of illustration, only two such rod guidesaare shown in FIG. 1, namely rod guide 28 housing a cluster 30 of radiation control rods (RCC) and a rod guid 32 housing a cluster 34 of water displacement rods (WDRC). The rods of each RCC cluster 30 and of each WDRC cluste 34 are mounted individually to the respectively corresponding spiders 30a and 34a. Mounting means 36 and 37 are provided at the respective upper and lower ends of the RCC rod guide 28 and, correspondingly, mounting means 38 and 39 are provided at the respective upper and lower ends of the WDRC rod guide 32. The lower end mounting means 37 and 39 rigidly mount hhe respective rod guides 28 and 32 to the upper core plate 19, as illustrated for the RCC rod guide mounting means 37 by bolt 37'. The upper mounting means 36 and 38 mount the respective rod guides 28 and 32 to a calandria assembly 50, and particularly to a lower calandria plate 52.

The calandria assembly 50, nn more detail, comprises a generally cylindrical, flanged shell 150 formed of a composite of the flange 50a, an upper connecting cylinder 152 which is welded at its upper and lower edges to the flange 50a and to the upper calandria plate 54, respectively, and a lower connecting cylinder, or skirt, 154 which is welded at its upper an lower edges to the upper and lower calandria plates 54 and 52, respectively. The lower connecting cylinder, or skirt, 554 includes an opening 154a aligned with each of the outlet nozzles 13 such that the axial core outlet flow received within the calandria 52 through the openings 52a in the lower calandria plate 52 may turn through 90° and exit radially from within the calandria 52 through the opening 154a to the outlet nozzle 13. The annular flange 50a which is received on the flange 26a to support the calandria assembly 50 on the mounting ledge 12e. Plural, parallel axial calandria tubes 56 and 57 are positioned in alignment with correspnding apertures in the lower and upper calandria plates 53 and 54, to which the calandria tubes 56 and 57 are mounted at their respective, opposite ends.

Extending upwardly beyond the upper calandria plate 54 and, more particularly, within the head assembly 12a of the vessel 12, there are provided plural flow shrouds 60 and 61 respectively aligned with and connected to the plural calandria tubes 56 and 57. A corresponding plurality of head extensions 62 and 63 is aligned with the plurality of flow shrouds 60, 61, the respective lower ends 62a and 63a being flared, or bell-shaped, so as to facilitate assembly procedures and, particularly, to guide the drive rods (not shown in FIG. 1) into the head extensions 62, 63 as the head assembly 12a is lowered onto the mating annular end surface 12d of the vessel sidewall 12b. The flared ends 62a, 63a also receive therein the corresponding upper ends 60a, 61a of the flow shrouds 60, 61 in the completed assembly, as seen in FIG. 1. The head extensions 62, 63 pass through the upper wall portion of the head assembly 12a and are sealed thereto. Control rod cluster (RCC) displacement mechanisms 64 and water displacement rod cluster (WDRC) displacement mechanisms 66 are associated with the respective head extensions 62, 63 flow shrouds 60, 61 and calandria tubes 56, 57 which, in turn, are associated with respective clusters of radiation control rods 30 and water displacement rods 34. The RCC displacement mechanisms (CRDM's) 64 may be of well known type, as are and have been employed with conventional reactor vessels. The displacer mechanisms (DRDM's) 66 for the water displacer rod clusters (WDRC's) 34 may be in accordance with the disclosure of U.S. Pat. No. 4,439,054 Veronesi, assigned to the common assignee hereof.

The respective drive rods (not shown in FIGS. 1A and 1B) associated with the CRDM's 64 and the DRDM's 66 are structurally and functionally the equivalent of elongated, rigid rods extending from the respective CRDM's 64 and DRDM's 66 to the respective clusters of radiation control rods (RCC's) 30 and water displacement rods (WDRC's) 34 and are connected at their lower ends to the spiders 30a and 34a. The CRDM's and DRDM's 64 and 66 thus function through the corresponding drive rods to control the respective vertccal positions of, and particularly, selectively to lower and/or raise, the RCC's 30 and the WDRC's 34 through corresponding openings (not shown) provided therefore in the upper core plate 19, telescopingly into or out of surrounding relationship with the respectively associated uuel rod assemblies 20. In this regard, the interior height $D_1$ of the lower barrel assembly 16 is approximately 178 inches, and the active length $D_2$ of the fuel rod assemblies 20 is apprxximately 153 inches. The interior, axial height $D_3$ is approximately 176 inches, and the extent of travel, $D_4$, of the rod clusters 30 and 34 is approximately 149 inches. It follows that the extent of travel of the corresponding CRDM and DRDM drive rods is likewise approximately 149 inches.

While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement which is achieved by selective positioning of the water displacement rod clusters 34.

The flow of the reactor coolant fluid, or water, through the vessel 10 pooceeds, generally, radially inwardly through a plurality of inlet nozzles 11, one of which is seen in FIG. 1, and downwardly through the annular chamber 15 which is defined by the generally cylindrical interior surface of the cylindrical side wall 12b of the vessel 12 and the generally cylindrical surface exterior surface of the sidewall 17 of the lower barrel assembly 16. The flow then reverses direction and passes axially upwardly through flow holes 18a in the lower core plate 18 and into the lower barrel assembly 16, from which it exits through a plurality of flow holes 19a in the upper core plate 19 to pass into the inner barrel assembly 24, continuing in prrallel axial flow therethrough and finally exiting upwardly through flow holes 52a in the lower calandria plate 52. Thus, parallel axial flow conditions are maintained through both the lower and inner barrel assemblies 16 and 24.

Within the calandria 50, the flow in general turns through 90° to exit radially from a plurality of outlet nozzles 13 (one of which is shown in FIG. 1). The inlet coolant flow also proceeds into the interior region of the head assembly 12a through perimeter bypass passageways in the mounting flanges received on the ledge 12e. Particularly, a plurality of holes 170, angularly spaced and at a common radius, are formed in the flange 17a and provide axially-directed flow paths from the annular chamber 15 into the annular space 172 intermediate the spring 27 and the interior surfaces of the sidewalls of the vessel 12; further, a plurality of aligned holes 174 and 176 extend through the flanges 26a and 50a, the holes 174 being angularly oriented, to complete the flow paths from the annular space 172 to the interior of the head assembly 12a. The flow of coolant proceeds from the head region through annular downcomer flow paths defined interiorly of certain of the flow shrouds 60, 61 and calandria tubes 56, 57, as later described, from which the head coolant flow exits into the top region of the inner barrel assembly 24, just below the lower calandria plate 52, to mix with the core outlet flow and pass through the calandria 50, exiting from rhe outlet nozzles 13.

A pluaality of calandria extensions 58 project downwardly from the calandria tubes 56 and connect to corresponding RCC mounting means 36 for the RCC rod guides 28. As explained in detail in conjunction with the subsequent figures, the RCC mounting means 36 comprise RCC top plates having central apertures which telescopingly receive the corresponding calandria extensions 58 and which provide for initial alignment thereof and, as well, of the matrix of concatenated and interdigitized WDRC top support plates. The calandria extensions 58, moreover, function, in cooperaiion with and in response to the mounting means 36 and 38, to react seismic forces from the RCC and WDRC rod guides 28 and 32 into the calandria 50, while accommodating axial height variations at the interface of the upper ends of the respective RCC and WDRC rod guides 28 and 32 and the lower calandria plate 52 arising from structural tolerances, thermal stresses and/or bowing of the rod giides, as explained more fully hereafter.

Figure 2A:
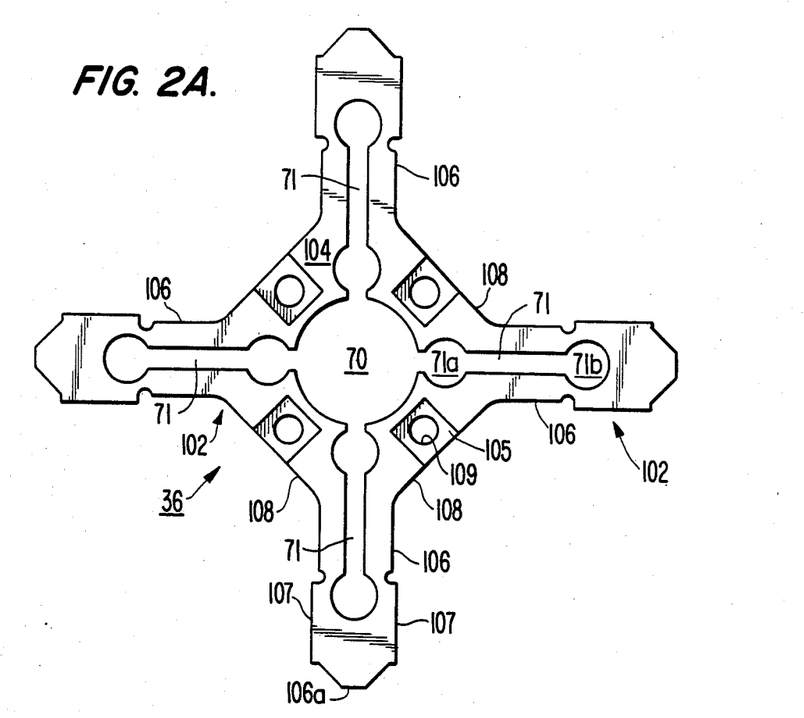
FIGS. 2A and 2B are top plan and elevational views, respectively, of an RCC rod guide top plate component of the top end support of the present invention.
Figure 2B:
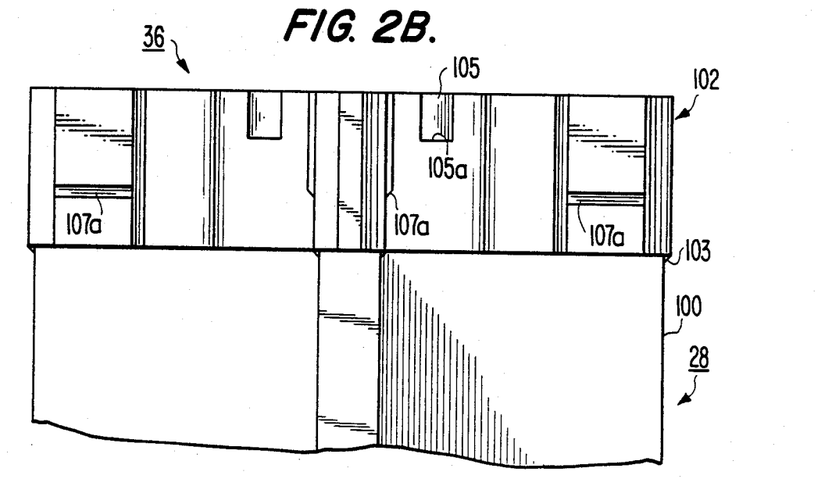

Components of the mounting means 36 for an RCC rod guide 28 in accordance with the present invention are shown in plan and elevational views in FIGS. 2A and 2B, respectively, to which concurrent reference is now had. The RCC rod guide 28 comprises, throughout substantially its entire length, a sidewall 100 of relatively thin (e.g., ¼ inch) sheet metal having a generally "X"-shaped exterior, or peripheral, cross-sectional configuration and defining an interior channel of corresponding configuration, add a reinforced sleeve, or top plate, 102 of a substantially similar exterior, or peripheral cross-sectional configuration which is secured to the upper end of the sidewall 100 by a weld bead as shown at 103. The top plate 102 is formed of a solid sheet of metal and machined to the configuration now described. Particularly, the top plate 102 comprises a central, generally square portion 104 and a plurality of equiangularly displaced major arms 106 extending diagonally from the central portion 104. The adjacent major arms 106 define respective interior vertices truncated by the corresponding, relatively diagonally oriented integral minor arms 108 defined by the edges of the central portion 104. Each of the major arms 106 terminates in a wedge-fit extension 106a and includes transverse extensions 107, having beveled lower edges 107a, on the opposite sides thereof and which serve for alignment purposes, in a manner to be described. At a central position of each diagonally oriented minor arm !08 there is formed a keyway segment 105 of generally rectangular cross-sectional configuration, in both horizontal and vertical planes, and a threaded bore 109 in the lower surface 105a thereof. The top plate 102 furthermore is machined so as to define a central, or interior, cylindrical channe 70 having radially extending narrow channels 71, each channel 71 including a pair of integral, smaller cylindrical channels 71a and 71b, the channel configuration accommodating an RCC rod cluster 30 of corresponding configuration, as later described.

Figure 3A:
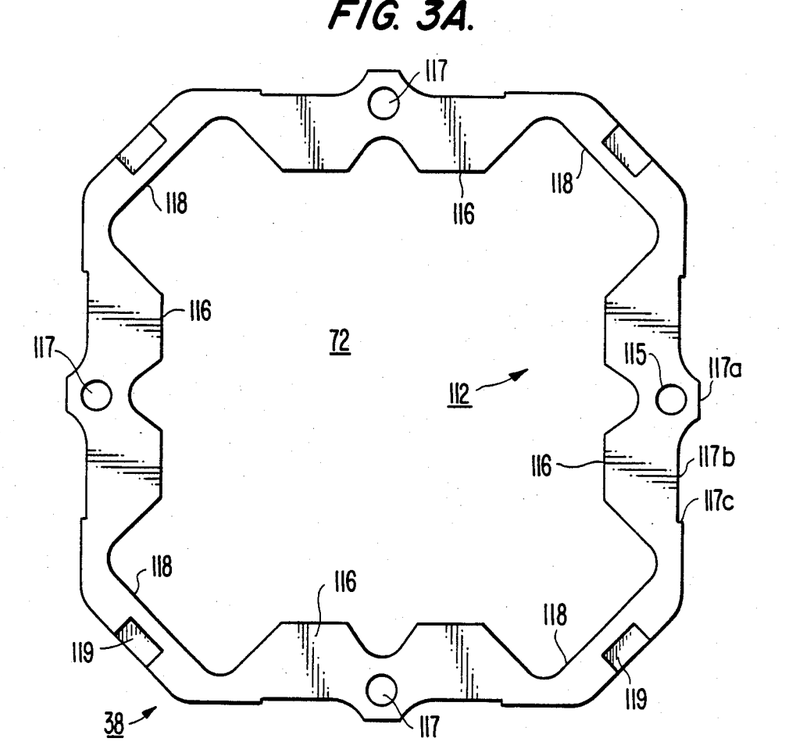
FIGS. 3A and 3B are top plan and elevational views, respectively, of an WDRC rod guide top plate component of the top end support of the present invention.
Figure 3B:
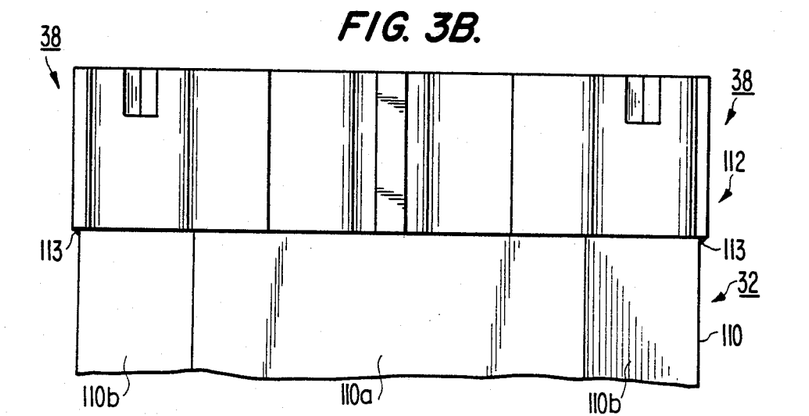

FIGS. 3A and 3B are plan and elevational views of components of the mounting means 38 for a WDRC rod guide 32 in accordance with the present invention, to which concurrent reference is now had. The WDRC rod guide 32 comprises a sidewall 110 of relatively thin metal (e.g., ¼ inch) of generally square cross-sectional configuration, including major wall portions 110a and minor, diagonally oriented wall portions 110b. A reinforced sleeve, or top support plate, 112, which may be machined from a solid, relatively thick sheet of metal, includes major arms 116 defining a generally square peripheral cross-sectional configuration. Adjacent major arms 116 are joined by integral, diagonally oriented minor arms 118 which define therewith the truncated, exterior vertices of the support plate 112. The major arms 116 and minor arms 118 of the top plate 112 correspond to the major and minor wall portions 110a and 110b, respecively, of the sidewall 110. The plate 112 is joined at its lower edge to the top edge of the sidewall 110 by a weld bead 113. The support plate 112 further is machined to define a generally square interior channel 72 configured to accommodate a WDRC rod cluster 34, as hereinafter illustrated and described. The exterior surface of each major arm 116 includes a central, wedge-fit extension 117a and a recessed surface 117b terminating at an edge or lip 117c and which together define an alignment channel. A threaded bore 115 is formed in the central portion of each major arm 116, generally in lateral alignment with the corresponding wedge-fit extension 117a. Further, a keyway segment 119 is formed in a central portion of each of the minor arms 118.

Figure 4:
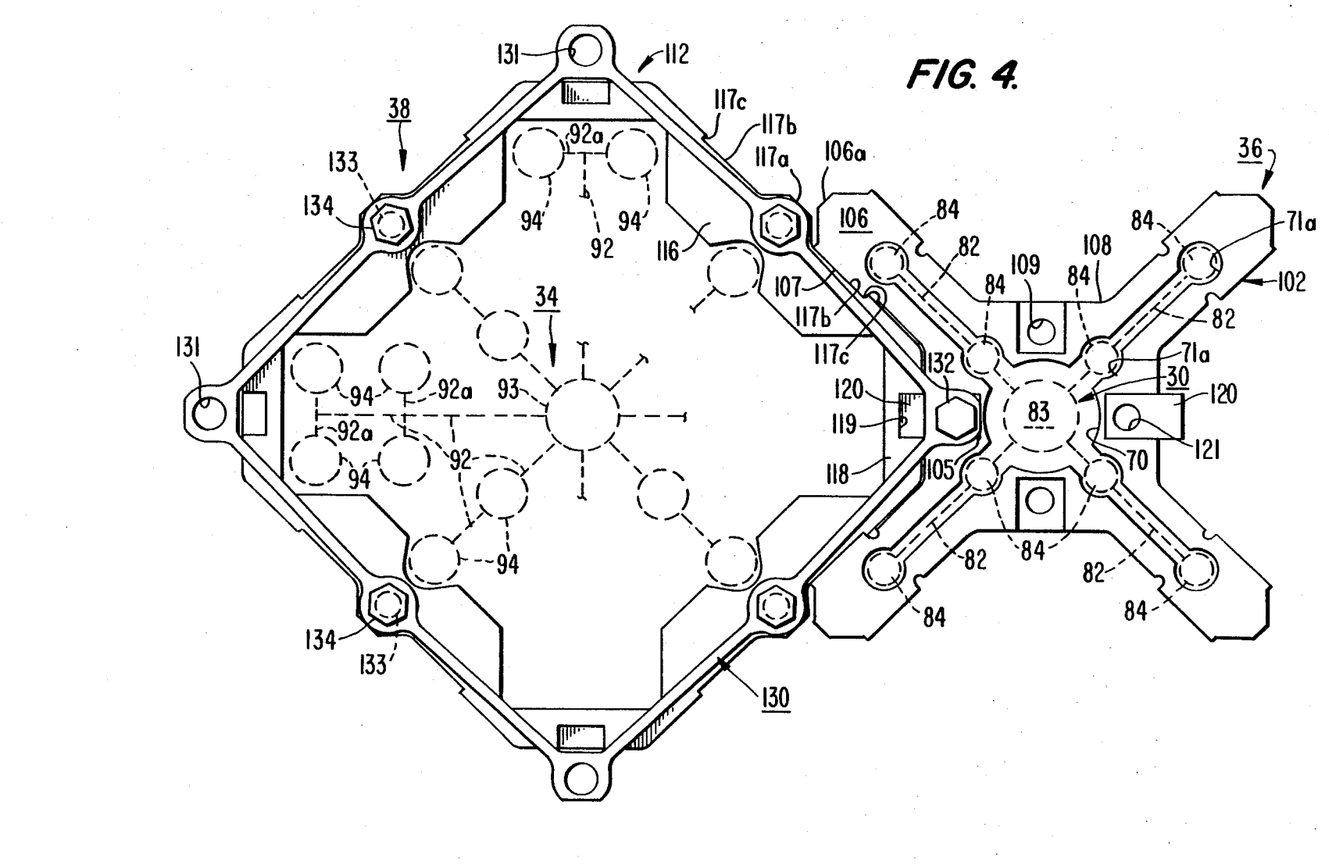
FIG. 4 is a top plan view of the assembled WDRC and RCC top end support components, incorporating a flexible linkage and a key, in accordance with the top end support of the present invention.

FIG. 4 is a plan view illustrating the assembled relationship of an RCC top support plate 102 of the RCC mounting means 36 and a WDRC top support plate 112 ofthe WDRC mounting means 38 and, particularly, the mating relationship of the respective interior and exterior vertices. It will be understood that additional top support plates 102 are correspondingly positioned with respective interior vertices receiving the remaining vertices of the WDRC top plate 112 and, likewise, that further WDRC top plates 112 are positioned in mating relationship with the RCC top plate 102, an exterior vertex of each such further WDRC top plate being received within each of the remaining interior vertices of the illustaated RCC top plate 102. There thus is formed an interleaved array of matrices of plural top plates 112 and 102. Necessarily, one or the other of the two types of top plates, typically RCC top plates 102, are positioned about the perimeter of the interleaved matrices.

In the assembled relationship shown in FIG. 4, the transverse extension 107 of the major arm 106 of the RCC support plate 102 is received within the channel defined by the recessed surface 117b and lip 117c on the major arm 116 of the contiguous WDRC top support plate 112, the transverse wedge-fit extension 117a of the major arm 116 and th wedge-fit extension 106a of the major arm 106 being disposed in contiguous, but spaced relationship. It will be understood that the contiguous sidewall surfaces of the support plates 102 and 112 are nominally space so as to avoid frictional or rubbing contact, which otherwise would introduce wear concerns. It will also be understood that in the assembled relationship of the top support plates 102 and 112, the respective keyway segments 105 and 119 are aligned and form a common keyway for receiving therein a solid bar-shaped key 120, a bore 121 therein being aligned with the threaded bore 109.

A linkage 130 of flexible metal includes enlarged portions at its corner vertices in which are formed apertures 131 and enlarged portions midway of the length of each arm in wiich are formed apertures 133. The linkage 130 conforms substantially to the generally square periphery of the WDRC top plate 112 and is positioned thereon such that the apertures 131 are aligned with the threaded bores 133 in the central portions of the major arms 116, and the corner apertures 131 are in alignment with the threaded bore 109 in the mating and contiguous minor arm 108 of the RCC top plate 102. A bolt 132 is received through the corner aperture 131 and the bore 121 in the key 120 and into threaded engagement in the threaded bore 109 of the minor arm 108 of the RCC top support plate 102; similarly, a bolt 134 is received through the aperture 133 in the center of each arm of the linkage 130 and into threaded engagement in the corresponding, aligned threaded bores 117 in the major arms 116 of the WDRC top support plate 112.

Respective matrices of top plates 102 and 112 thus are interdigitized by virtue of the respective structural components defining the mating, interior and exterior veriices thereof. The keys 120 provide for initial alignment of the contiguous, mating RCC and WDRC top plates 102 and 112, along with the alignment function afforded by the transverse extensions 107 of the major arms 106 of the WDRC support plate 102 and the channel defined by the recessed surface 117b and lip 117c of the contiguous major arm 116 of the WDRC top support plate 112. Further, the top support plates 102 and 112 are laterally interlocked by the flexible linkage 130 in a two-dimensional, concatenated relationship (i.e., in a plane corresponding to that of FIG. 4), whereby each of the top plates 38 is linked rigidly in the lateral direction to four respectively surrounding RCC top plates 36—and, in turn, each of the RCC top plates 36 is laterally interlocked at its four ineerior vertices to the associated, exterior vertices of the four interdigitized and contiguous WDRC top plates 38. It will be appreciated that whereas the interdigitized relationship exists throughout the majority of the array, as is apparent, the periphery of the array necessarily will be defined by one or the other of the top plates 102 and 112—typically, the RCC top plates 102.

Figure 5:
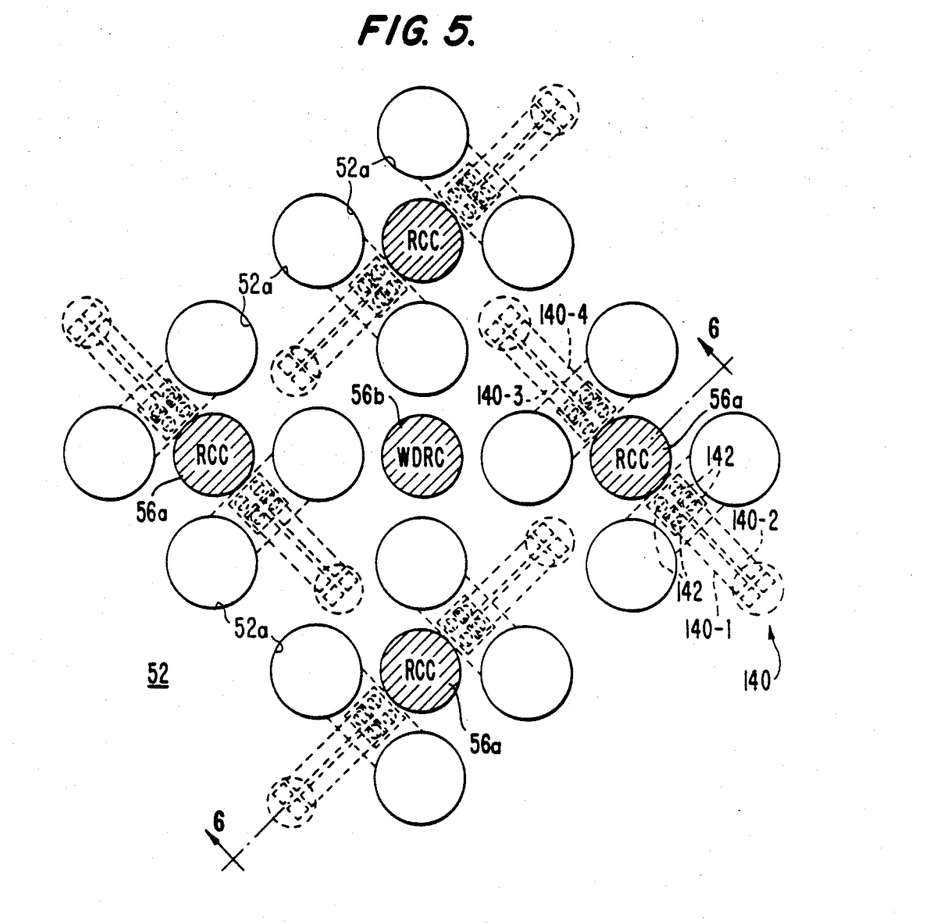
FIG. 5 is a simplified schematic view, partially in cross-section, taken in a horizontal plane through the line 5—5 in FIG. 1A.
Figure 6:
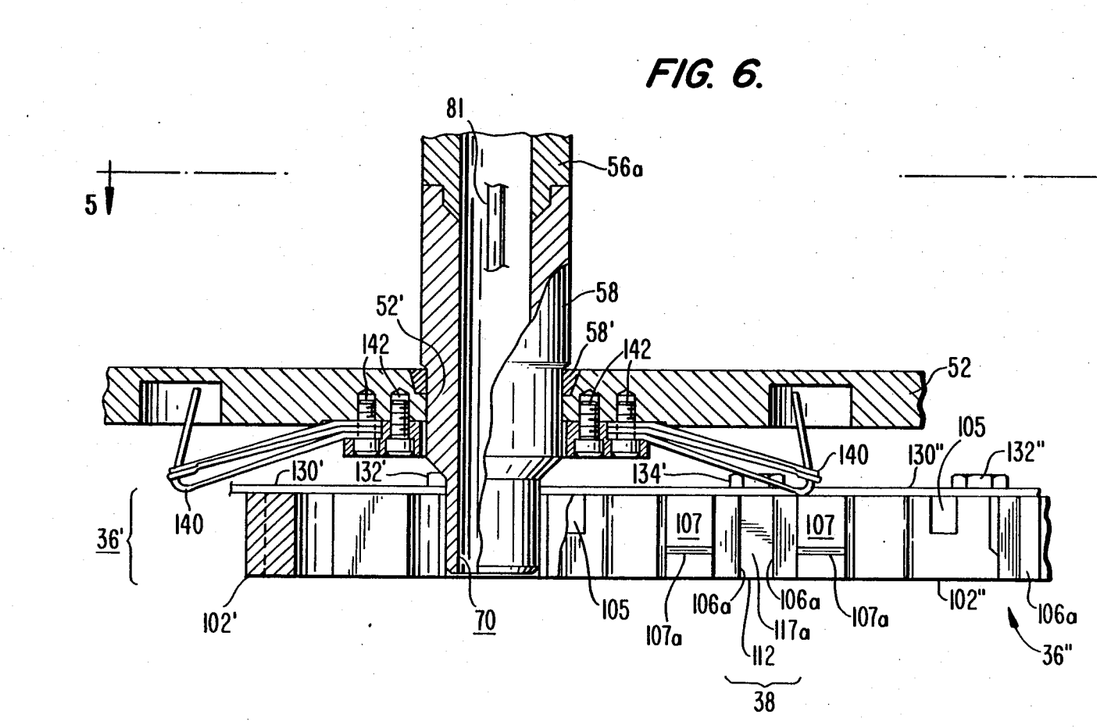
FIG. 6 is a fragmentary, elevational, partially in cross-section, taken in a vertical plane along the line 6—6 in FIG. 5.

The mounting means 36 and 38 at the interface between the top ends of the RCC and WDRC rod guides 28 and 32, respectively, and the lower calandria plate 52, is explained more fully with reference to FIGS. 5 and 6. FIG. 5 comprises a schematic and fragmentary planar view taken in a plane along the line 5—5 as shown in FIG. 1 and also in FIG. 6, and FIG. 6 comprises an elevational and fragmentary view, partially in cross-section, taken in a plane along the line 6—6 in FIG. 5.

With concurrent reference to FIGS. 5 and 6, the calandria tubes 56 of FIG. 1A are now shown as calandria tubes 56a which are associated with the RCC rod clusters 30 and calandria tubes 56b which are associated with the WDRC rod clusters 34. As before noted, a drive rod extends through each of the calandria tubes 56a and 56b for connection to the hubs 83 and 93 of the respective RCC rod clusters 30 and WDRC rod cluster 34, an illustrative drive rod 81 for an RCC rod cluster being shown in FIG. 6. The calandria extensions 58 (FIG. 6) extend through corresponding apertures 52′ in the lower calandria plate 52 and are secured thereto, as shown by weld bead 58'. The lower portion of the calandria extension 58 may be of reduced exterior diameter, as shown, and is received in telescoping relationship within the central, generally cylindrical channel 70 of an RCC top plate 102, thus establishing initial alignment of each RCC top plate 102 relative to the lower caladdria plate 52. It will be understood that each top plate 36 receives a corresponding calandria extension 58 in its channel 70. Accordingly, the RCC top plates 36 initially are aligned and supported against lateral movement by the plurality of calandria extensions 58 and ultimately by the lower calandria plate 52, and the WDRC to plates 38 are correspondingly aligned and supported by their interdigitized and concatenated relationship to the RCC top plates 36.

FIGS. 5 and 6 also illustrate leaf springs 140 which resiliently load the top surfaces of the RCC top plates 102, and which generate sufficient lateral frictional force such that fluctuating steady state loads applied to the guides do not cause slippage; the springs 140 also compensate for effects of differential thermal expansion and minimize adverse effects of resulting forces due to such thermal expansions. Collectively, the leaf springs 140 function to resist movement of the rod guides in unison, or as a package and the linkages serve to resist individual rod guide motion, relative to the stability afforded by the collective action of the leaf springs 140—correspondingly preventing wear of the rod guides and of each rod cluster, relative to its associated, nndividual rod guide. More particularly, the leaf springs 140 are attached to the lower surface of the lower calandria plate 52 by suitable screws 142; as seen better in FIG. 5, the leaf springs 140 comprise two parallel pairs 140-1, 140-2 and 140-3, 140-4, for a total of four (4) springs, the first pair of springs 140-1 and 140-2 being aligned with the second pair of springs 140-3 and 140-4 and thus displaced from one another by 180°. about the generally circular cross-section of the RCC calandria tube 56a. Moreover, with respect to the matrix of RCC top plates 102 and the corresponding RCC calandria tubes 56a, the leaf springs 140 are rotated by 90° for successive RCC calandria tubes 56a of a given row, the leaf springs 140 for the respective, column-related calandria tubes 56a of successive, adjacent parallel rows being offset by 90°.

FIG. 6 illustrates two adjacent RCC mounting means 36' and 36" as they would appear in assembled and interdigitized relationship with a WDRC mounting means 38; specifically, the RCC top plates 102' and 102" of the RCC mounting means 36' and 36" are illustrated as positioned contiguous respective, opposed surfaces of a common major arm 106 of an interdigitized WDRC top plate 112, only the wedge-fit extension 117a of the latter being visible in the view of FIG. 6. As further shown in FIG. 6 for one of the two related pairs of leaf springs 140 extending from a given calandria extension 58 associated with a given top plate 102', the outer free ends of each pair of leaf springs 140 engage the upper surface of the corresponding major arm 106 of the aligned and next adjacent RCC top plate 36", at the outer, free ends thereof adjacent the extension 106a. Further, due to the symmetrical and regular array of calandria tubes 56a and associated extensions 58 and the alternating parallel and transverse orientations of the leaf springs 140, it will be apparent that each RCC top plate 102 is engaged by a symmetrically loaded force by corresponding pairs of leaf springs 140 at the outer extremities of the aligned, or 180° displaced, major arms 106 thereof so as to maintain a symmetrical or balanced loading force thereon.

The internal configuration of the respective RCC and WRRC top plates 102 and 112 is designed to accommodate the configuration of the respectively associated RCC rod clusters 30 and 34. Specifically, a central hub 83 of the cluster 30 supports radially extending arms 82 to which are secured generally cylindrical cross-section, elongated RCC rods 84, received within the respective, radially displaced cylindrical channels 71a. In like fashion, the WDRC top support plate 112 has an interior configuration selected to accommodate the outer periphery of a WDRC rod cluster 34 of plural control rods 594, each of generally cylindrical, elongated configuration. Specifically, the WDRC rod cluster 34 includes a central hub 93 and radially extending, equiangularly displaced arms 92, a first orthogonal set of which support WDRC control rods 94 at radially inward and outward positions; a further equiangularly displaced, orthogonal set of radially extending arms 92 each includes cross-arms 92athe outer extremities of which support respective WDRC control rods 94.

The requirements which must be satisfied by the flexible rod guide support structure of the invention, as outlined briefly above, including the adverse environmental conditions (i.e., vibration, and both axial and lateral displacement forces) which exist within the inner barrel assembly 24 and the manner in which the flexible rod guide support structure of the present invention accommodates these conditions and satisfies those requirements, is now discussed, with reference again to FIG. 1. As before noted, the flexible support structure of the invention must not introduce sources of vibration, itself, and, most significantly, must not be susceptible to excessive wear which, over time, would cause the mounting assembly to loosen and eventually permit vibrations to ensue.

Particularly, the concatenated and interdigitized matrices of the RCC top plates 102 and WDRC top plates 112 effectively present a single, relatively stiff stricture of mutullly, or interdependently, supported top plates at the interface of the inner barrel assembly 24 and the lower calandria plate 52, as represented in FIG. 1 by the respective RCC and WDRC mounting means 36 and 38—but which nevertheless permits a limited extent of relative axial motion of the rod guides 28 and 32 by out-of-plane bending of the flexible linkages 130. The extent of relative movement between adjacent top plates 102 and 112, as permitted by in-plane tensile elongation of the flexible linkages 130, however, is limited by the keys 120, which provide an ultimate load capacity for very large loads. Thus, under very large loads, the keys 120 prevent excessive loading of any of the flexible linkages 130 and ensure that loads from the WDRC rod guides 32 are transmitted by the associated WDRC top plates 112 through the concatenated and interdigitized RCC top plates 102 into the calandria bottom plate 52.

As previously noted, the leaf springs 140 serve to react normal operational fluctuating loads laterally, by the frictional forces generated by their engagement with the top surfaces of the RCC top plttes 102. The leaf springs may be of the type known as 17×17 fuel assembly springs, which are typically employed in conjunction with the fuel rod assemblies 20 in the lower barrel assembly 16. As employed in accordance with the present disclosure, the leaf springs 140 may be designed to react nominally a force of 388 lbs. at each RCC top plate 102, assuming a coefficient of 0.3 without slippage. More specifically, the nominal force applied to each RCC top plate 102 is 1,294 lbs., with a range of 918 lbs. to 1,528 lbs. Accordingly, assuming a coefficient of friction of 0.3, the lateral force can be nominally as great as 388 lbs. before any movement of a given RCC top plate 3102 would occur. Differential lateral forces across the array thus may be compensated for and reacted to independently by the corresponding leaf springs 140. The concatenated design particularly precludes impact wear from occurring between the rod guide top plates 102 and 112 and the calandria extensions 58. To the extent that such wear does occur, and particularly relative to the calandria extensions 58, the extent and effect of such wear is believed not significant relative to rod guide alignment or the structural capability of the extensions 58 to react to seismic loads. To the extent that wear relative to a particular extension 58 occurs, in like fashion, the associated leaf springs 140 will continue to maintain both axial and lateral alignment, and to react forces tending to cause lateral displacement, thus limiting the extent of excitation and, ultimately, the extent of wear on the RCC rod guides 28 and WDRC rod guides 32 and the respective rodlet clusters 30 and 34.

The concatenated relationship of the interdigitized matrices of the array affords the further significant benefits of distributing force effects via the flexible linkages 130 and compensating for differential axial expansion and lateral forces acting on the array, throughout the entirety of the interdigitized rod guide top plates 102 and 112, and thus minimizing wear potential with respect to any given calandria extension 58 and its respectively associated RCC top plate 102, and of the interface between any given rod guide and its associated rodlet cluster. Thus, the potential of wear due both to axial sliding forces arising, for example, from core plate vibration and as well due to lateral forces resulting from differential thermal and other effects is greatly decreased; moreover, the structure is self-compensating even as to any specific, individual connection with a given calandria extension 58 which has worn due, for example, to initial mechanical misalignment.

As can be appreciated from FIG. 6, only minimal axial space is required to accommodate the array of top plates 102 and 112 and the associated flexible linkages 130, along with the leaf springs 140; this enables use of the flexible rod guide support srructure of the invention without requiring any modification of the vessel 10 to accommodate an axially elongated inner barrel assembly 24. As is clear from FIG. 5, taken further in the context of FIG. 1, the flexible support structure of the invention does not interfere with the required free passage of core outlet flow through the openings 52a provided therefor in the lower calandria plate 52 (i.e., at which the support structure of the invention presents an interface, as eefore noted).

Assembly and disassembly of the calandria 50 with respect to the associated rod guide top support means 36 and 38 is readily accomplished in accordance with the flexible top end support of the present invention. With reference to FIG. 4, assume that three additional RCC top plates 102 are positioned in mating relationship with the remaining exterior vertices of the WDRC top plate 112 and aligned therewith through the corresponding, respective keys 120 and linked thereto by corresponding bolts received through the respective corner apertures 31 of the linkage 130. Removal of a WDRC top plate 38 requires merely the removal of the four bolts 133 which secure the flexible linkage 130 thereto, and of the four bolts 132 which secure the vertices of the linkage 130 to the contiguous, surrounding RCC top plates 102. Removal of the bolts 132, moreover, upon removal of the linkage 130, permits removal of the keys 120. Upon release of the lower mounting means 38 from the upper core plate 19, the WDRC rod guide 32 may be telescopingly withdrawn from within the inner barrel assembly 24. Assembly, or re-assembly, correspondingly is readily accomplished, by the reverse sequence of the steps just recited.

In a practical implementation, for reducing the number of separate, individual items, the bolts 132 and 133 may have upper, unthreaded portions of the shafts such that they may be threaded through the corresponding apertures in linkage 130 and thereafter be freely rotatable, to facilitate threading into or out of the corresponding top plates in assembly and disassembly operations. Further, the keys 120 preferably are secured to the respective linkages 130, to provide a unitary structure.

The present invention accordingly provides a simplified, flexible upper end support for the cantilever-mounted rod guides of a pressurized water reactor of the advanced design herein contemplated; it should be understood, however, that the support of the invention may be employed in pressurized water reactors of convention designs. The structural components are of simplified configuration and reduced cost, yet nevertheless afford ease of assembly and disassembly while providing the requisite structural support and satisfying the functional, operational requirements. Numerous modifications and adaptations of the invention will be apparent to those of skill in the art, and thus it is intended by the appended claims to cover all such modifications and adaptations as fall within the true spirit and scope of the appended claims.

We claim as our invention:

1. A support for the top ends of a plurality of elongated rod guides of at least first and second types, generally vertically disposed within a pressurized water reactor vessel in corresponding, at least first and second interleaved matrices, said vessel having lower and upper support structures and said rod guides having lower ends fixedly supported on the lower support structure and upper ends disposed adjacent to and spaced vertically below the upper support structure, said support comprising:

plural top support plates of at least first and second types, disposed on and connected to the respective top ends of said corresponding, at least first and second types of rod guides;

said top support plates of said at least first and second types having respectively mating, exterior peripheral surfaces for assembly of each said top support plate of one said type in mating relationship with respective, contiguous and surrounding top support plates of another said type;

said respective, mating exterior peripheral surfaces further comprising a vertically extending, recessed channel in one said peripheral surface and a mating transverse extention in said mating peripheral surface, received in said vertically extending recessed channel in telescoping relationship in the assembly of each said contiguously surrounding top support plate with said top support plate of said one type, each top support plate of one of said first and second types being independently, vertically and telescopingly movable, into and out of assembly with the respective, contiguously surrounding top support plates of the other said type;

means for resiliently interconnecting each top support plate of one type with each of said respective, contiguous and surrounding top support plates of the other said type; and said type being each top support plate of a selected adapted for connection to the upper support structure of a pressure vessel in which said elongated rod guides and respectively associated top support plates are disposed.

2. A support as recited in claim 1, further comprising:
plural key way segments formed in each said top support plate of each said type, at predetermined positions in each said top plate of one said type aligned with respective, predetermined positions of corresponding key way segments in said contiguous, surrounding top support plates assembled in mating relationship therewith; and plural keys respectively received in said aligned, plural key way segments of said contiguous, assembled top plates.

3. A support as recited in claim 2, wherein each said key, received in said respective, aligned keyway segments, is secured to a predetermined one of said contiguous, assembled top plates.

4. A support as recited in claim 3, wherein there is further provided a bolt for securing each said key to said predetermined top plate.

5. A support as recited in claim 1, wherein said resilient interconnecting means laterally interlock said plural top support plates in a two-dimensional, concatenated relationship and resiliently restrains relative, vertical differential displacements of the individual, interconnected said top plates and associated rod guides.

6. A support as recited in claim 1, wherein said resilient interconnecting means comprises a plurality of flexible linkages respectively connected to said plurality of top support plates of said one type, each said flexible linkage further being connected to each of said respective, contiguous and surrounding top support plates.

7. A support as recited in claim 1, wherein:
said upper support structure of said vessel further comprises a plurality of spaced, downward extensions corresponding to and defining axes of alignment with respective said top support plates of at least said selected type; and each of said top support plates of said selected type includes a central receiving aperture therein for receiving a respective, downward extension in the assembled relationship of said rod guides and respective top support plates with the upper support structure of said vessel.

8. A support as recited in claim 1, wherein there is further provided:
resilient means respectively associated with each of said top support plates of said selected type, connected to and extending downwardly from said upper support structure, each said resilient means selectively contacting and exerting a vertically downward force on the respective said top support plate in said assembled relationship, to establish a frictional, engaging force opposing lateral displacement of the respective said top support plate from said axially aligned position thereof.

9. A support as recited in claim 8, wherein said resilient means comprise leaf springs, each said leaf spring having a central aperture for receiving the respectively corresponding downward extension of said top support plate, and laterally, downwardly extending arms, each said arm engaging the top surface of a respective top support plate.

10. A support as recited in claim 9, wherein each said selected top support plate is engaged by at least two said leaf springs at positions thereon so as to maintain a symmetrical force thereon relative to the axis thereof.

11. A flexible support structure for the upper ends of first and second pluralities of rod guides of respective first and second different types disposed as corresponding, interleaved first and second matrices thereof in parallel axial relationship within an inner barrel assembly of a pressurized water reactor vessel for receiving therein respective, corresponding first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly and said first and second pluralities of rod guides being disposed in parallel axial relationship in an array of interleaved, respective first and second matrices with the bottom ends thereof affixed to said first plate and the top ends thereof disposed adjacent said second plate, comprising:

a first matrix of plural top support plttes of a first type disposed on and connected ot the respective top ends of said first plurality of rod guides of said first type, each said top support plate of said first type comprising a unitary structure of plural arm segments in an annular configuration and having an exterior peripheral surface generally corresponding to the configuration of the respectively associated top end of said rod guide of said first type and an interior opening permitting axial passage therethrough of a corresponding rod cluster of said first type, said plural arm segments comprising a plurality of successive major arms having coreesponding peripheries and the peripheries of successive pairs of adjacent major arms defining a plurality of corresponding exterior vertices;

a second matrix of plural top support plates of a second type disposed on and connected to the respective top ends of said second plurality of rod guides of said second type, each said top support plate of said second type comprising a unitary structure of pluarl arm segments having an exterior peripheral surface generally corresponding to the configuration of the top end of said respectively associated rod guides of said second type and an interior opening permitting axial passage therethrough of a corresponding rod cluster of said second type, said plural arm segments comprising a plurality of successive major arms having corresponding peripheries and the peripheries of successive pairs of adjacent major arms defining a plurality of corresponding interior vertices, the interior vertices of each said top plate of said second type corresponding to respective, exterior vertices of each said top plate of said first type for receiving a respective, said exterior vertex therein in mating relationship;

said respective, mating exterior peripheral surfaces further comprising a vertically extending, recessed channel in one said peripheral surface and a transverse extension in said mating peripheral surface, received in said vertically extending recessed channel in telescoping relationship in the assembly of each said contiguously surrounding top support plate with said top support plate of said first type, with the interior vertices of said top plates of said second type receiving, in mating relationship therein, respectively corresponding exterior vertices of said respective, contiguous said top plates of said first type, each top support plate of one of said first and second types being independently, vertically and telescopingly movable, into and out of assembly with the respective, contiguously surrounding top support plates of the other said type;

a linkage connecting position on each of the adjacent major arms associated with each exterior vertex of said top plate of said first tupe, and a linkage connecting position at each mating, interior vertex of each said contiguous top plate of said second type, and a flexible linkage secured at said linkage connecting positions of, and interconnecting, said contiguous, first and second top plates assembled with said respective vertices in mating relationship.

12. A support as recited in claim 11, further comprising:
plural key way segments formed in said mating vertices of said first and second top support plates at respective, aligned positions when said first and second top plates are assembled in said contiguous, mating relationship; and
plural keys respectively received in said aligned, plural key way segments of said contiguous, assembled top plates.

13. A support as recited in claim 12, wherein each said key, received in said respective, aligned keyway segments, is secured to a predetermined one of said contiguous, assembled top plates.

14. A support as recited in claim 13, wherein there is further provided a bolt for securing each said key to said predetermined top plate.

15. A flexible support as recited in claim 11, further comprising:
a plurality of extensions depending from said second plate and respectively corresponding to said plurality of top plates of said second type;
each said top plate of said second type defining a central receiving aperture for receiving a corresponding said depending extension therewithin, thereby to axially align each of said top plates of said second type and the associated said rod guides of said second type within said inner barrel assembly.

16. A flexible support as recited in claim 15, wherein there is further provided a plurality of resilient means respectively associated with said top plates of said second type, each said resilient means being secured to said second plate and contacting and exerting a vertically downward force on a respectively associated top plate of said second type, thereby establishing a frictional engaging force opposing lateral displacement of each said top plate of said second type and the rod guide associated therewith from the said axially aligned position thereof.

17. A flexible support as recited in claim 16, wherein:
each top plate of said second type includes at least a pair of aligned, first and second said major arms, said pairs of aligned major arms of said plurality of top plates of said second type being disposed in alternating transverse relative relationship in both the row and column directions of said matrix thereof; and said resilient means associated with each of said top support plates of said second type comprises a pair of first and second resilient means engaging the extremities of the respective first and second major arms of said aligned pair thereof.

18. A flexible support as recited in claim 17, wherein each of said first and second resilient means of the pair thereof associated with each given, said top support plate of said second type is of elongated configuration and is disposed in alignment with the respectively associated aligned pair of first and second major arms of said given top plate of said second type, said respective first and second resilient means being connected at first ends thereof to said second plate at positions adjacent the correspondingly aligned said depending extension next adjacent the said depending extension received in said given top plate of said second type.

19. A flexible support as recited in claim 18, wherein each said resilient means comprises a leaf spring.

20. A flexible support as recited in claim 11, wherein:
each said top plate of said first type is of generally square configuration and defines four exterior vertices;
each said top plate of said second type is of generally cross-shaped configuration and defines four interior vertices;
each given top plate of said first type has four top plates of said second type contiguous thereto, an interior vertex of each thereof receiving in mating relationship therein a corresponding exterior vertex of said given top plate of said first type;
each said flexible linkage is of generally square configuration, corresponding substantially to the dimensions of each said top plate of said first type, and comprises four continuously connected arms in a generally square configuration, each said flexible linkage being associated with a respective, given said top plate of said first type and rigidly connecting same in a plane transverse to the axis of said assembly and flexibly connecting same in a plane parallel to the axis of said assembly to said four contiguous top plates of said second type assembled in mating relationship therewith.

21. A flexible support as recited in claim 20, wherein each of said flexible linkages is connected at the corners thereof to said connecting positions at the respective, mating interior vertices of said four contiguous top plates of said second type and is connected at intermediate positions on the respective arms thereof to respectively corresponding intermediate positions on said major arms of the respective given said top plate of said first type.

22. A flexible support as recited in claim 21, wherein:
each said connecting position comprises a threaded bore; and
each said flexible linkage is connected to said connecting positions by bolts received therethrough and in the corresponding said threaded bores.

23. A pressurized water reactor system having a vessel including an inner barrel assembly within which are disposed at least first and second pluralities of rod guides of respective, at least first and second pluralities of rod guides of respective, at least first and second different types in corresponding, at least first and second interleaved matrices thereof and in parallel axial relationship, said first and second pluralities of rod guides receiving therein respective, at least first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly, the bottom ends thereof being affixed to said first plate and the top ends thereof being disposed adjacent said second plate, and a support structure for the upper ends of said rod guides comprising:
- at least first and second matrices of plural top support plates of corresponding, at least first and second different types, disposed on and connected to the respective top ends of said corresponding pluralities of rod guides of said at least first and second types;
- said top support plates of said at least first and second different types having respective, mating exterior peripheral surfaces comprising interior and exterior vertices for assembling the respective said top support plates of said matrices thereof in interdigitated relationship with exterior vertices of one said type received in mating relationship by said interior vertices of another said type;
- said respective, mating exterior peripheral surfaces further comprising a vertically extending, recessed channel in one said peripheral surface and a transverse, lateral extension in said mating peripheral surface, received in said vertically extending recessed channel in telescoping relationship in the assembly of each said contiguously surrounding top support plate with said top support plate of said one type;
- a plurality of extensions depending from said second plate and respectively corresponding to said plurality of top plates of said second type;
- each said top plate of said second type defining a central receiving aperture for receiving a corresponding said depending extension therewithin, thereby to axially align each of said top plates of said second type and the associated said rod guides of said second type within said inner barrel assembly; and
- a plurality of resilient means respectively associated with said top plates of said second type, each said resilient means being secured to said second plate and contacting and exerting a vertically downward force on a respectively associated top plate of said second type, thereby establishing a frictional engaging force opposing lateral displacement of each said top plate of said second type and the rod guide associated therewith from the said axially aligned position thereof.

24. A reactor system structure as recited in claim 23, further comprising:
- plural keyway segments formed in said mating vertices of said first and second top support plates at respective, aligned positions when said first and second top plates are assembled in said contiguous, mating relationship; and
- plural keys respectively received in said aligned, plural keyway segments of said contiguous, assembled top plates.

25. A reactor system structure as recited in claim 24, further comprising:
- a flexible linkage interconecting a given top plate of one of said types with each contiguous top plate of said other of said types having the respective said vertices thereof in mating relationship, thereby to interconnect all of said top plates of all of said types in a concatenated relationship.

* * * * *